United States Patent Office 3,847,907
Patented Nov. 12, 1974

3,847,907
NOVEL N-(OXIDOALKYL) ANILINES
Ladislav Dolejs, Letohradska 56, 7; Zuzana Machkova, Mezibranska 7, 1; Pavel Beran, Nar. obrany 7, 6; Jitka Kahovcova, ul. P. Rezka 3, 4; Karel Slama, 674 Na cervenem vrchu, 6; and Frantisek Sorm, 9 Korejska, 6, all of Prague, Czechoslovakia
No Drawing. Filed Apr. 15, 1971, Ser. No. 134,460
Claims priority, application Czechoslovakia, May 5, 1970, 3,123/70
Int. Cl. C07d 1/00
U.S. Cl. 260—240 H
16 Claims

ABSTRACT OF THE DISCLOSURE

N-(oxidoalkyl) anilines prepared by treatment of N-alkenyl anilines with organic peracid which are useful insect control agents.

---

This invention relates to novel compounds of formula I:

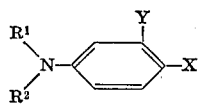

wherein,
X is

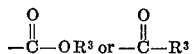

$-\overset{O}{\underset{\|}{C}}-OR^3$ or $-\overset{O}{\underset{\|}{C}}-R^3$ in which $R^3$ is hydrogen, lower alkyl, aryl or aralkyl;
Y is hydrogen, or together with X, forms the methylenedioxy bridge;
$R^1$ is one of the groups A, B or C:

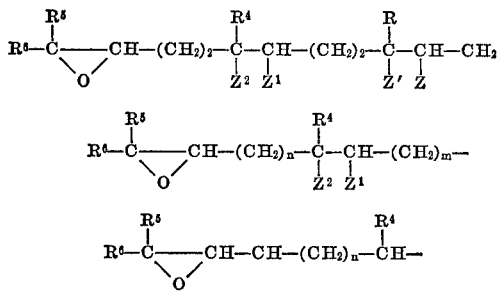

in which each of R, $R^4$, $R^5$ and $R^6$ is hydrogen or lower alkyl; Z is hydrogen and Z' is hydrogen, or together with Z, a carbon-carbon bond or oxido; $Z^1$ is hydrogen and $Z^2$ is hydrogen, or together with $Z^1$, a carbon-carbon bond or oxido;

$R^2$ is hydrogen, lower alkyl, or lower acyl, or one of the groups A, B or C;
m is the positive integer one or two; and
n is the positive integer two or three.

The term "aryl," as used herein, refers to an aryl group of six to twelve carbon atoms, such as phenyl, naphthyl and methylphenyl. The term "lower acyl" refers to a carboxyl acyl group of one to six carbon atoms.

The term "lower alkyl," as used herein, refers to an alkyl group, straight or branched, having a chain length of one to six carbon atoms and more usually one to three carbon atoms.

The term "aralkyl," as used herein, refers to aralkyl of seven to twelve carbon atoms, such as benzyl, phenethyl, methylbenzyl and naphthylmethyl.

The novel compounds of the present invention are useful for the control of insects. The utility of these compounds as insect control agents is believed to be attributable to their juvenile hormone activity. They are preferably applied to the immature insect, namely—during the embryo, larvae or pupae stage in view of their ability to inhibit metamorphosis and otherwise cause abnormal development. These compounds are effective control agents for Hemipteran, such as Lygaeidae, Miridae and Pyrrhocoridae; Coleopteran; Lepidopteran, such as Pyralidae, Noctiidae and Gelechiidae; Dipteran, such as mosquitoes; Orthoptera, such as roaches; and Homoptera, such as aphids. The compounds can be applied at low dosage levels of the order of 0.001 μg. to 25 μg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 50% of the active compound is employed. The formulation can include insect attractants, emulsifying agents and wetting agents to assist in the application and efficiency of the active ingredient.

The compounds of the present invention are prepared by a process which comprises introducing to the nitrogen atom of the aniline of formula II;

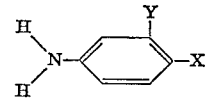

wherein the symbols X and Y represent the same as above, one or two residues represented by the symbols $R^1$ and $R^2$ which each represent oxidoalkyl or oxidoalkenyl and $R^2$ additionally represents hydrogen, lower acyl or lower alkyl.

The introduction of the group or groups $R^1$ and $R^2$ may be performed in one step by treating directly the aniline derivative II with an oxidoalkyl halide or oxidoalkenyl halide or, in two steps, i.e., by substituting first the aniline derivative II by the action of an alkenyl halide possessing one or more double bonds, and then forming the epoxide group or groups, preferably by the action of an organic peracid. In other words, the epoxidation of the alkenyl group may be effected before or after the substitution of the aniline derivative II.

When one of the amino hydrogen atoms is protected by an acyl group, e.g., trifluoroacetyl group, this acyl group may be eventually removed by hydrolysis or retained without any loss of activity.

Introduction of two alkenyl groups or, one such group and one alkyl group into the molecule of the aniline derivative II and the subsequent epoxidation by the action of an organic peracid, e.g., perphthalic acid, may be probably accompanied by a partial or complete oxidation of the tertiary amine nitrogen atom under the formation of the corresponding N-oxide;

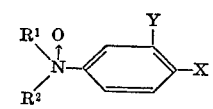

which displays similar effects as the corresponding amine and does not require to be separated from other reaction products. Its separation, e.g., by chromatography, would be of importance when the N-oxide or another component of the reaction mixture would exhibit a specific activity on some certain species of harmful insect. Usually it is possible to apply the crude reaction mixture without separating the individual components.

Alkenyl substituted anilines can be prepared as described in application Ser. No. 98,093, filed Dec. 14, 1970, which is incorporated by reference.

The following examples are provided to illustrate the present invention.

EXAMPLE 1

N-Trifluoroacetyl - N - (6,7-oxido-3,7-dimethyloctyl) p-aminoacetophenone and N-(6,7-oxido-3,7-dimethyl-octyl-p-aminoacetophenone Trifluoroacetyl - p - aminoacetophenone.—p-Aminoacetophenone (1.35 g.) is dissolved in absolute ether (50 ml.) and the solution is treated dropwise under stirring with trifluoroacetyl anhydride in ether (10 g. in 10 ml.). The reaction mixture is refluxed under stirring for 30 minutes, evaporated to dryness, and the solid residue is crystallized from aqueous ethanol (1:1) to afford 2.1 g. of the title substance, m.p. 160–161.5° C.

N-Trifluoroacetyl-p-aminoacetophenone Sodium Salt

Trifluoroacetyl-p-aminoacetophenone (11.1 g.) is dissolved under stirring in an 1M solution (48 ml.) of sodium methoxide in methanol. The solution is allowed to stand for a few minutes and then precipitated with ether. The solid is collected and air-dried on a filter paper. Yield, 12 g. of the title salt (does not melt up to 360° C.).

N-Trifluoroacetyl-N-citronellyl-p-aminoacetophenone

A solution of p-acetyltrifluoroacetanilide sodium salt (1.5 g.) in dimethylformamide (30 ml.) is treated dropwise with citronellyl bromide (2.6 g.) and the whole mixture is heated at 70–80° C. for 5 hours. The reaction mixture is diluted with water, extracted with ether, the extract dried with sodium sulfate, and evaporated. The pure product may be obtained by chromatography on a column of silica gel, total yield 1.45 g. (60.5%). Mass spectrum: molecular peak at 369, characteristic peaks at m/e 300, 284, 244, 232, 216, 138, 95, and 69.

N-Trifluoroacetyl-N-(6,7-oxido-3,7-dimethyloctyl)-p-aminoacetophenone (a) N-Trifluoroacetyl - N - citronellyl-p-aminoacetophenone (0.44 g.) is oxidized with excess (2 mol) ethereal perphthalic acid. After 24 hours at room temperature, the reaction mixture is diluted with additional ether, washed with 1N sodium hydroxide (30 ml.), dried over sodium sulfate, and evaporated. Yield, 0.33 g. (70%) of the title product. Mass spectrum: molecular ion at 385, characteristic peaks at m/e 357, 342, 300, 286, 244, 232, and 216.

(b) A solution of N-trifluoroacetyl-p-aminoacetophenone (1.3 g.) in dimethylformamide (30 ml.) is treated with 6,7-oxido-3,7-dimethyloctyl bromide (2.55 g.); the mixture is allowed to stand at room temperature for 12 hours and then cautiously heated for 6 hours at 50° C. and for additional 6 hours at 70° C. The reaction mixture is diluted with water, extracted with ether, the extract dried over sodium sulfate, evaporated, and the residue chromatographed on a column of silica gel. Yield, 0.52 g. of the title substance.

N-(6,7-Oxido-3,7-dimethyloctyl)-p-aminoacetophenone

N-Trifluoroacetyl-N-(6,7-oxido - 3,7 - dimethyloctyl)-p-amino-acetophenone (0.25 g.) is added to 1N sodium hydroxide (5 ml.) and the mixture is made homogeneous by the addition of minimum amount of ethanol. After 18 hours at room temperature, the reaction mixture is extracted with ether, the extract dried over sodium sulfate, and evaporated to afford 0.2 g. of the residue. Mass spectrum: characteristic peaks at m/e 289 (M), 203, 189, and 148.

EXAMPLE 2

Ethyl N-Trifluoroacetyl-N-(6,7-oxido-3,7-dimethyl-2-octenyl)-p-aminobenzoate

Ethyl N-Trifluoroacetyl-N-geranyl-p-aminobenzoate.—The ethereal solution of ethyl N-geranyl-p-aminobenzoate is treated with trifluoroacetic anhydride (5 mol) and allowed to stand at room temperature for 1 hour. The reaction mixture is washed with water and an aqueous solution of sodium hydrogen carbonate, dried over sodium sulfate, and evaporated to afford the product in a quantitative yield.

Ethyl N-Trifluoroacetyl-N-(6,7-oxido-3,7-dimethyl-2-octenyl)-p-aminobenzoate

The ethereal solution of the above mentioned trifluoroacetanilide derivative is treated with excess ethereal perphthalic acid (1.8 mol), the reaction mixture is allowed to stand at room temperature for 1 hour, washed successively with aqueous sodium carbonate and water, dried, and evaporated to afford a relatively pure product in a quantitative yield.

Ethyl N-(6,7-Oxido-3,7-dimethyl-2-octenyl)-p-aminobenzoate

The 1N aqueous solution of sodium hydroxide (1.1 ml.) is added to ethyl N-trifluoroacetyl-N-(6,7-oxido-3,7-dimethyl-2-octenyl)-p-aminobenzoate (0.3 g.), the mixture is made homogeneous by the addition of a minimum amount of ethanol, and allowed to stand at room temperature for 24 hours. The solution is neutralized by the addition of 50% aqueous acetic acid, the ethanol is evaporated under diminished pressure, and the residue is shaken with a mixture of ether and water. The ethereal layer is dried over sodium sulfate and evaporated to afford an oily product (0.22 g.) which may be purified on a column of silica gel. Mass spectrum: characteristic peaks at 317 (M), 272, 244, 231, 218, 165, 137, and 120.

EXAMPLE 3

Ethyl N,N-Bis-(6,7-oxido-3,7-dimethyl-2-octenyl)-p-aminobenzoate N-Oxide

An ethereal solution of ethyl N,N-digeranyl-p-aminobenzoate (1.5 g.) is oxidized with excess (2.2 mol) perphthalic acid. The reaction mixture is allowed to stand at 0° C. for 24 hours and then washed with an aqueous solution of sodium carbonate and water. The ethereal layer is dried over sodium sulfate, evaporated, and the residue chromatographed on a column of silica gel to afford 0.85 g. of the title product. Mass spectrum: characteristic peaks at m/3 475 (M), 317, 316, 178, 165, and 120.

As a by-product, a substance was isolated in yields up to 0.2 g., which is ascribed the structure of ethyl N-geranyl-N-(6,7-oxido - 3,7 - dimethyl-2-octenyl)-p-aminobenzoate N-oxide. Mass spectrum: peaks at 469 (M), 333, 288, 178, 165, and 120.

EXAMPLE 4

Each of the epoxides under column I is reacted with 3,4-methylenedioxyaniline using the process of Example 1 to prepare the respective aniline under column II. The epoxides are prepared by treatment of the corresponding unsaturated halide with m-chloroperbenzoic acid.

I 6,7-oxido-3,7-dimethyloctyl bromide
4,5-oxido-1,5-dimethylhexyl bromide
6,7-oxido-3,7-dimethylnon-2-enyl bromide
6,7-oxido-3-ethyl-7-methylnon-2-enyl bromide
7,8-oxido-4,8-dimethylnon-3-enyl bromide
10,11,3,7,11-trimethyldodeca-2,6-dienyl bromide
6,7,10,11-bisoxido-3,7,11-trimethyldodec-2-enyl bromide
6,7-oxido-3,7-dimethyloct-2-enyl bromide
N-(6,7-oxido-3,7-dimethyloctyl)3,4-methylenedioxyaniline
N-(4,5-oxido-1,5-dimethylhexyl)3,4-methylenedioxyaniline
N-(6,7-oxido-3,7-dimethylnon-2-enyl)3,4-methylenedioxyaniline N-(6,7-oxido-3,7-dimethylnon-2-enyl)3,4-methylene-
enedioxyaniline
N-(7,8-oxido-4,8-dimethylnon-3-enyl)3,4-methylene-
dioxyaniline
N-(10,11-oxido-3,7,11-trimethyldodeca-2,6-dienyl)3,4-
methylenedioxyaniline
N-(6,7,10,11-bisoxido-3,7,11-trimethyldodec-2-enyl)
3,4-methylenedioxyaniline
N-(6,7-oxido-3,7-dimethyloct-2-enyl)3,4-methylene-
dioxyaniline

EXAMPLE 5

Each of the bromides under column I is reacted with methyl p-aminobenzoate to prepare the respective aniline under column III.

III methyl N-(6,7-oxido-3,7-dimethyloctyl) p-aminobenzoate
methyl N-(4,5-oxido-1,5-dimethylhexyl) p-aminobenzoate
methyl N-(6,7-oxido-3,7-dimethylnon-2-enyl) p-amino-
benzoate
methyl N-(6,7-oxido-3-ethyl-7-methylnon-2-enyl)
p-aminobenzoate
methyl N-(7,8-oxido-4,8-dimethylnon-3-enyl) p-amino-
benzoate
methyl N-(10,11-oxido-3,7,11-trimethyldodeca-2,6-
dienyl)-p-aminobenzoate
methyl N-(6,7,10,11-bisoxido-3,7,11-trimethyldodec-2-
enyl)-p-aminobenzoate
methyl N-(6,7-oxido-3,7-dimethyloct-2-enyl) p-amino-
benzoate By reacting the bromides under column I with ethyl p-aminobenzoate in place of methyl p-aminobenzoate, the respective ethyl N-oxidoalkyl and N-oxidoalkenyl p-amino-benzoates are prepared.

EXAMPLE 6

Each of the bromides under column I is reacted with methyl p-aminophenyl ketone to prepare the respective compound under column IV.

IV methyl N-(6,7-oxido-3,7-dimethyloctyl) p-aminophenyl
ketone
methyl N-(4,5-oxido-1,5-dimethylhexyl) p-aminophenyl
ketone
methyl N-(6,7-oxido-3,7-dimethylnon-2-enyl) p-amino-
phenyl ketone
methyl N-(6,7-oxido-3-ethyl-7-methylnon-2-enyl)
p-aminophenyl ketone
methyl N-(7,8-oxido-4,8-dimethylnon-3-enyl) p-amino-
phenyl ketone
methyl N-(10,11-oxido-3,7,11-trimethyldodeca-2,6-
dienyl) p-aminophenyl ketone
methyl N-(6,7-oxido-3,7-dimethyloct-2-enyl) p-amino-
phenyl ketone By using ethyl p-aminophenyl ketone in the foregoing process in place of methyl p-aminophenyl ketone, the respective ethyl N-oxidoalkyl and oxidoalkenyl p-amino-phenyl ketone are prepared.

Activity Tests

The test substances were applied to the body surface of freshly molted last larval instars or freshly molted pupae in a constant 1 microliter drop of an acetone solution. In injection assays, the test substances were injected into the same developmental stages in 1 microliter of olive oil. In the sterilization assays on females, the test substances were applied in 1 microliter of acetone to the body surface of two day old females.

Activity Evaluation

The juvenile hormone activity was evaluated from the degree of morphological change induced after the subsequent molting. The effects are expressed in ID-50 activity units (half inhibition of metamorphosis) indicating that amount of the substance in micrograms which under the above mentioned application caused formation of half-larval, half-imaginal adultoids (with beetles). These adultoids are completely unable of a further development and die. Even lower doses than ID-50 may lead to death of the population. The sterilization activity was evaluated on the basis of effects on the embryonal development according to the hatching ability.

The table shows the juvenile hormone activity on some insect species of both the complete and incomplete metamorphosis. The numerical data relate to ID-50 in micrograms per specimen.

It may be seen from the table that the test substances display a considerably high activity; in some cases, this activity is about thousand times higher than with classical insecticides. Furthermore, the test substances are very active when applied topically. The test substances belong to the group of selective pesticides since some of them are active only on some insect species and inactive on the other. This is a great advantage in contrast to classical insecticides which kill insect without any exception.

The test substances may be used as insect pesticides of the novel generation, cf. C. M. Williams: Sci. Amer. 217, 13 (1967). They can be applied in field conditions in the form of a spray, dusting or aerosol. They may be used for contamination of insect localities and of insect food. The effect of the test substances consists in the formation of deformed specimens incapable of a further development or in the sterility of eggs.

| | Pyrrhocoridae | | Pentatomidae—Graphosora italicum topical | Lygaeidae—Lygaeus equestris, topical | Tenebrionidae—Tenebrio molitor | |
|---|---|---|---|---|---|---|
| | Pyrrhocoris apterus, topical | Dysdercus cingulatus, topical | | | Top. | Inj. |
| I | 0.1 | 0.07 | 10 | | | 100 |
| II | 0.3 | 0.05 | 0.1 | | | 1 |
| III | 0.08 | 0.005 | 0.1 | 1 | | |
| IV | | 0.001 | >100 | | >1,000 | >1,000 |
| V | 0.01 | 0.008 | >100 | | >1,000 | >1,000 |
| VI | 0.1 | | 10 | | | 50 |
| VII | 0.7 | | 1 | | | 0.1 |
| VIII | 0.1 | 0.07 | >100 | | >1,000 | >1,000 |

NOTE.—I=Methyl N-(6,7-oxido-3,7-dimethyloctyl) p-aminophenyl ketone; II=Methyl N-(6,7-oxido-3,7-dimethyloct-2-enyl) p-aminophenyl ketone; III=Ethyl N-(6,7-oxido-3,7-dimethyloct-2-enyl) p-aminobenzoate; IV=Ethyl N,N-bis(6,7-oxido-3,7-dimethyloct-2-enyl) p-aminobenzoate N-oxide; V=Ethyl N-(3,7-dimethylocta-2,6-dienyl)-N-(6,7-oxido-3,7-dimethyloct-2-enyl) p-aminobenzoate N-oxide, VI=Methyl N-(6-7-oxido-3,7-dimethyloctyl)-N-trifluoroacetyl p-aminophenyl ketone; VII=N-(6,7-oxido-3,7-dimethyloct-2-enyl) 3,5-methylenedioxyaniline; VIII=N-(6,7,10,11-bisoxido-3,7,11-trimethyldodec-2-enyl)3,4-methylenedioxyaniline.

Compounds II and V when applied to adult female Pyrrhocoris (0.1–1.0-micrograms) caused more than 50% permanent sterility of eggs; consequently, they belong to the best known ovicides.

What is claimed is:

1. A compound selected from those of the following formula I:

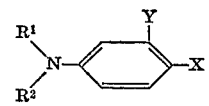

wherein,
X is

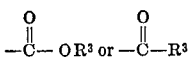

in which R³ is hydrogen, lower alkyl, benzyl, phenethyl, methylbenzyl, naphthylmethyl, phenyl, naphthyl or methylphenyl,
Y is hydrogen, or together with X, forms the methylenedioxy bridge;
R¹ is one of the groups A, B or C:

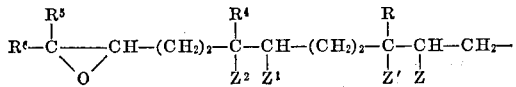

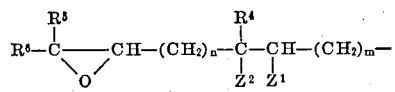

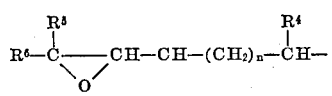

in which each of R, R⁴, R⁵ and R⁶ is hydrogen or lower alkyl; Z is hydrogen and Z' is hydrogen, or together with Z, a carbon-carbon bond or oxido; Z¹ is hydrogen and Z² is hydrogen, or together with Z¹, a carbon-carbon bond oxido;
R² is hydrogen, lower alkyl, or a carboxylic acyl group containing one to six carbon atoms, or one of the groups A, B or C;
$m$ is the positive integer one or two; and
$n$ is the positive integer two or three.

2. A compound selected from those of the following formula I:

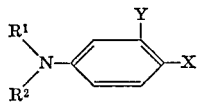

wherein,
X is

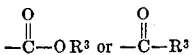

in which R³ is hydrogen, lower alkyl, benzyl, phenethyl, methylbenzyl, naphthymethyl, phenyl, naphthyl or methylphenyl,
Y is hydrogen, or together with X, forms the methylenedioxy bridge;
R¹ is one of the groups A or B:

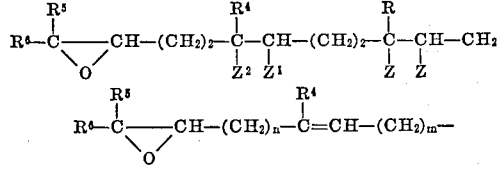

in which each of R, R⁴, R⁵ and R⁶ is hydrogen or lower alkyl; Z' together with Z is a carbon-carbon bond; Z¹ is hydrogen and Z² is hydrogen, or together with Z¹, a carbon-carbon bond, when Z² together with Z¹ is a carbon-carbon bond, then Z and Z' may be hydrogen;
R² is hydrogen, lower alkyl, or carboxylic acyl of 1 to 6 carbons, or one of the groups A or B;
$m$ is the positive integer one or two; and
$n$ is the positive integer two or three.

3. A compound as defined in claim 2 selected from those of the following formula I:

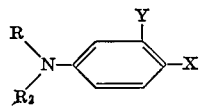

wherein,
X is

in which R³ is hydrogen, lower alkyl, benzyl, phenethyl, methylbenzyl, naphthylmethyl, phenyl, naphthyl or methylphenyl,
Y is hydrogen, or together with X, forms the methylenedioxy bridge;
R¹ is one of the groups A or B:

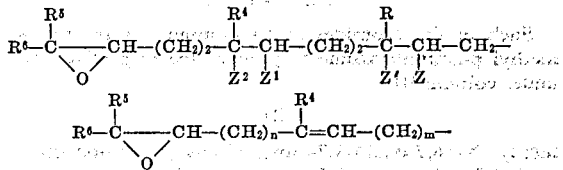

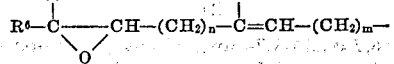

in which each of R, R⁴, R⁵ and R⁶ is hydrogen or lower alkyl; Z' together with Z is a carbon-carbon bond; Z¹ is hydrogen and Z² is hydrogen, or together with Z¹, a carbon-carbon bond, when Z² together with Z¹ is a carbon-carbon bond, then Z and Z' may be hydrogen;
R² is hydrogen, lower alkyl, or carboxylic acyl or 1 to 6 carbons, or one of the groups A or B;
$m$ is the positive integer one or two; and
$n$ is the positive integer two or three.

4. A compound as defined in claim 2 selected from those of the following formula I:

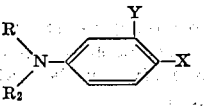

wherein,
X is

in which R³ is hydrogen, lower alkyl, benzyl, phenethyl, methylbenzyl, naphthylmethyl, phenyl, naphthyl or methylphenyl,
Y is hydrogen;
R¹ is one of the groups A or B:

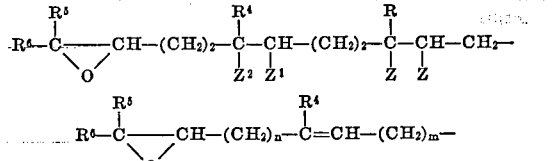

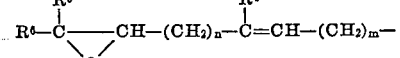

in which each of R, R⁴, R⁵ and R⁶ is hydrogen or lower alkyl; Z' together with Z is a carbon-carbon bond; Z¹ is hydrogen and Z² is hydrogen, or together with Z¹, a carbon-carbon bond; when Z² together with Z¹ is a carbon-carbon bond, then Z and Z' may be hydrogen;
R² is hydrogen, lower alkyl, or carboxylic acyl or 1 to 6 carbons, or one of the groups A or B;
$m$ is the positive integer one or two; and
$n$ is the positive integer two or three.

5. A compound as defined in claim 2 selected from those of the following formula I:

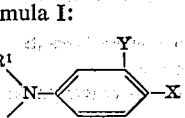

wherein,
X is

in which R³ is hydrogen, lower alkyl, benzyl, phenethyl, methylbenzyl, naphthylmethyl, phenyl, naphthyl or methylphenyl, Y is hydrogen;

R¹ is:

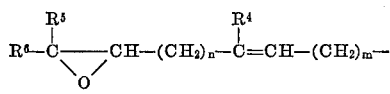

in which each of R⁴, R⁵ and R⁶ is hydrogen or lower alkyl;

R² is hydrogen, lower alkyl, or carboxylic acyl or 1 to 6 carbons, or R¹;

m is the positive integer one or two; and n is the positive integer two or three.

6. A compound according to claim 2 wherein R¹ is the group

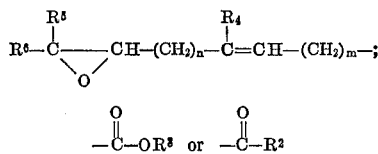

Y is hydrogen and X is in which R³ is methyl or ethyl.

7. A compound according to claim 6 wherein n is two, m is one, each of R⁴, R⁵ and R⁶ is methyl or ethyl and R² is hydrogen, lower alkyl or same as R¹.

8. A compound according to claim 7 wherein R⁴ is methyl and R² is hydrogen.

9. A compound according to claim 8 wherein R⁵ is methyl.

10. A compound according to claim 2 of the formula

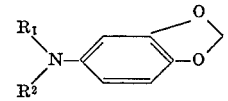

11. A compound according to claim 10 wherein R¹ is

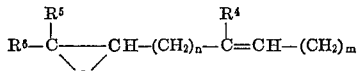

in which each of R⁴, R⁵ and R⁶ is methyl or ethyl; m is one; n is two.

12. A compound according to claim 11 wherein R² is hydrogen, lower alkyl or same as R¹.

13. A compound according to claim 12 wherein R⁴ is methyl and R² is hydrogen.

14. A compound according to claim 13 wherein R⁵ is methyl.

15. A compound according to claim 14 wherein R⁶ is methyl.

16. A compound which is ethyl N-(6,7-oxido-3,7-dimethyloct-2-enyl) p-aminobenzoate.

References Cited

UNITED STATES PATENTS 3,429,970   2/1969   Ruegg et al. _____ 424—333

OTHER REFERENCES

South African Patent Journal, Feb. 1968, p. 179 (abstract of So. African Patent 67/5149) Chemical Abstracts (Suchy et al.), vol. 70, abstract No. 9625k (1969).

Bowers et al., Science vol. 154, pp. 1020 to 1021 (1966).

JOHN D. RANDOLPH, Primary Examiner

U.S. Cl. X.R.

424—278, 282; 260—348 A, 570 R